United States Patent [19]
Bilinovich, Jr.

[11] Patent Number: 5,758,555
[45] Date of Patent: Jun. 2, 1998

[54] VERTICAL TURNING MACHINE

[75] Inventor: Louis P. Bilinovich, Jr., Clinton, Ohio

[73] Assignee: J.R. Engineering, Barberton, Ohio

[21] Appl. No.: 639,529

[22] Filed: May 1, 1996

[51] Int. Cl.$^6$ ..................................................... B23B 3/00
[52] U.S. Cl. ................................................ 82/122; 82/142
[58] Field of Search ........................... 82/122, 142, 165

[56] References Cited

U.S. PATENT DOCUMENTS

| | | | |
|---|---|---|---|
| 1,472,105 | 10/1923 | Ward | 82/122 |
| 1,485,383 | 3/1924 | Fowl et al. | 82/122 |
| 4,642,861 | 2/1987 | Riley et al. | 82/122 |

*Primary Examiner*—Daniel W. Howell
*Attorney, Agent, or Firm*—Renner, Otto, Boisselle & Sklar

[57] ABSTRACT

A turretless turning machine dedicated to the manufacture of a limited number of parts includes a base, a spindle assembly for holding and turning a workpiece, a motor, a direct drive assembly for transferring power from the motor to the spindle assembly, and a cutting assembly, the base being of sufficient mass and area to provide a damping force that facilitates reducing vibrations and harmonics generated by the machine, the motor and direct drive assembly being adapted to rotate the spindle assembly about a vertical axis at a rate wherein chip fragments aviate off of a workpiece being machined such that heat generated by the tooling process is removed by the chips which have absorbed the heat.

11 Claims, 2 Drawing Sheets

1

VERTICAL TURNING MACHINE

TECHNICAL FIELD

The present invention relates generally to turning machines, and more specifically to a new and unique vertical turning machine which is adapted for high-speed rotation of parts, greater stability, less chatter, and which does not require cooling lubricants to prevent heat build-up during the machining process.

BACKGROUND OF THE INVENTION

Turning machines are well known in the art. Turning machines are used to machine desired metal pieces and shapes from a piece of stock as the stock is turned or rotated at a relatively high speed. A typical turning machine includes a frame, a chuck assembly for holding a piece of stock material in place relative to the machine, a motor and transmission for rotating the chuck assembly and stock material at a desired speed, and a tooling assembly for machining the stock material as it is turned. The tooling assembly generally includes a turret which holds a variety of cutting tools and allows for any of a number of these cutting tools to be interchanged for use in machining a part. Typically, turning machines also include a controller which controls the radial and axial positioning of a cutting tool to produce a part of the desired shape.

One type of turning machine is known as a vertical turning machine as the stock to be machined rotates around a vertical axis as it is machined. Various other types of turning machines are also known.

Turning machines are generally adapted to produce a wide variety of parts, and thus are capable of operating at a wide variety of speeds and of holding a large number of different cutting tools which can be interchanged during the machining process to produce the particular part desired. While conventional turning machines are well adapted to perform a wide variety of machining operations, there are unfortunately several drawbacks with existing turning machines. For example, conventional turning machines require a cooling lubricant to be applied to the cutting edge of the cutting tool to remove heat generated during the cutting operation. Otherwise, the heat generated from the cutting operation may cause the turned part, such as an aluminum part, to melt, and may otherwise damage the finish of the machined part. Unfortunately, coolant is expensive, leaves a residue on the finished part and on the turning machine, and may pose environmental and health problems.

Additionally, as a typical turning machine is designed to be highly versatile, it often requires a transmission to adjust the turning speed of the stock material, a turret to house a large number of cutting tools, and various other assemblies to improve the flexibility and versatility of the machine.

As a result of the complexity of many turning machines, they also are difficult and expensive to maintain and tend to wear very quickly. One area of wear in many conventional turning machines is the drive arrangement. The drive arrangement typically includes a motor, a transmission, a clutch to engage rotational power to the spindle and chuck assembly, and a number drive belt and pulleys. In such an arrangement, the drive components typically communicate power through a number of drive belts and pulley which are maintained under significant tension so that the drive power from the motor can be efficiently transferred to the spindle and chuck.

Unfortunately, the transmission, the clutch and the brake tend to wear significantly as do the bearings of the various rotational items, such as the pulleys, because of the significant amount of belt tension and resultant stresses on the various components. Another drawback of many turning machines is that the rotational speed of the stock material, and thus the speed at which the material can be machined, is limited to speeds below which these machines tend to experience chatter and vibration which can harm the machine or damage the part being machined.

It would be desirable to provide a turning machine which could turn the part to be machined at a higher frequency and thus allow the part to be machined faster, as well as to provide a machine that does not require significant cooling lubricants or exhibit significant vibration or chatter during the cutting process.

SUMMARY OF THE INVENTION

The present invention provides a dedicated turning machine which is able to produce one part or a small range of parts at very high speed and preferably without the use of cooling lubricants. The invention includes a motor adapted to run at very high speeds and which is connected to the spindle through a direct drive arrangement. Preferably, the drive arrangement includes a timing belt and timing pulleys to efficiently transfer rotational power from the motor to the spindle with minimal wear on the rotating parts. Preferably, the machine is designed throughout to minimize the number of moving parts, and thus to reduce the vibrational characteristics of the machine. For example, the turret may be eliminated as the machine is dedicated to producing a small variety of parts.

In accordance with one aspect of the present invention, a turretless turning machine dedicated to the manufacture of a limited number of parts includes a base, a spindle assembly for holding and turning a workpiece, a motor, a direct drive assembly for transferring power from the motor to the spindle assembly, and a cutting assembly, the base being of sufficient mass and area to provide a damping force that facilitates reducing vibrations and harmonics generated by the machine, the motor and direct drive assembly being adapted to rotate the spindle assembly about a vertical axis at a rate wherein chip fragments aviate off of a workpiece being machined such that heat generated by the tooling process is removed by the chips which have absorbed the heat.

In accordance with another aspect of the machine, a vertical turning machine includes a base, a spindle assembly mounted to the base for turning a workpiece, a motor mounted to the base for powering the spindle assembly, a direct drive assembly for transferring power from the drive motor to the spindle and a cutting assembly for removing material from the workpiece, wherein the direct drive assembly includes a first timing pulley mounted to the motor and a second timing pulley mounted to the spindle assembly and a timing belt extending between the pulleys.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
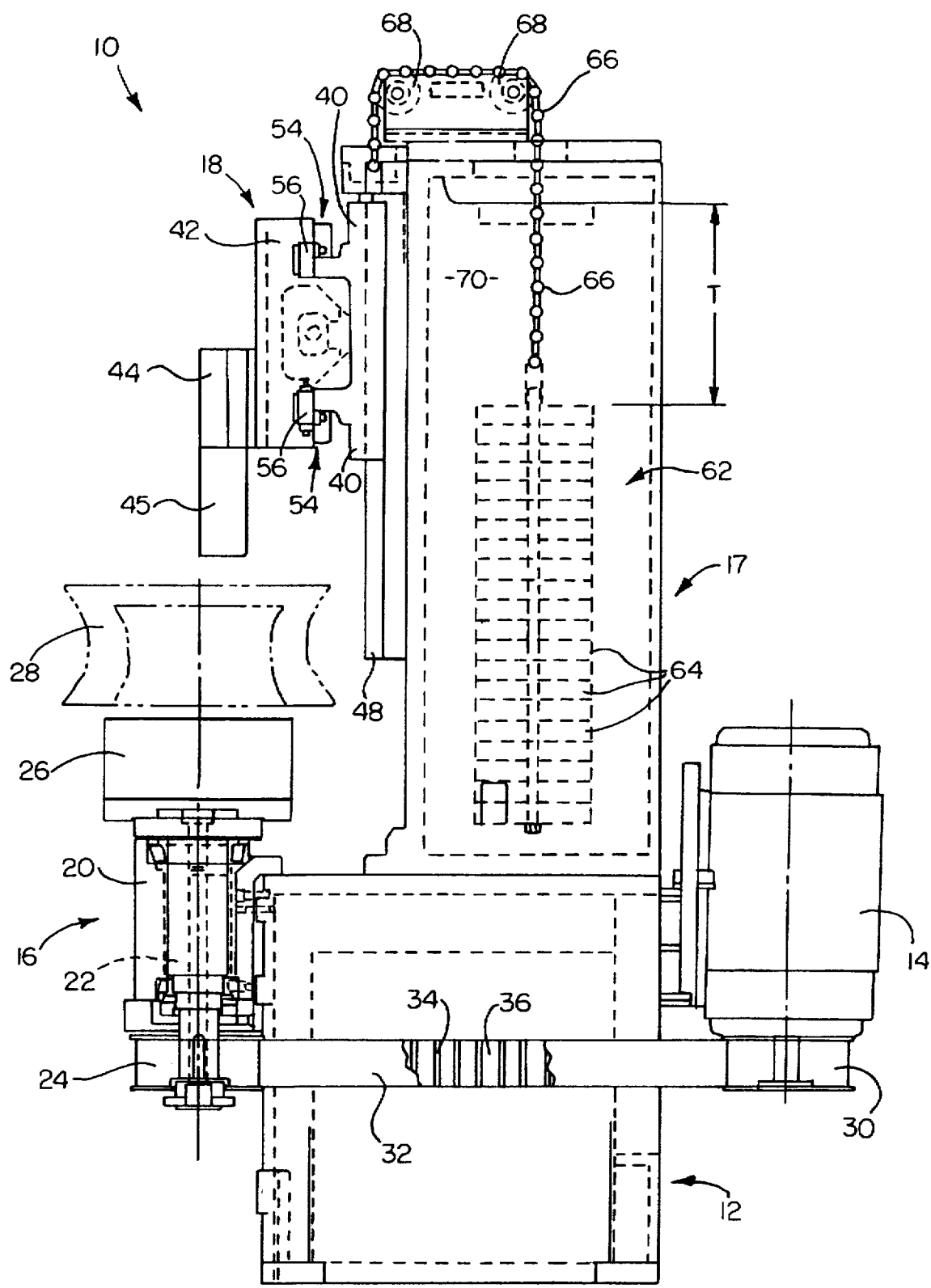
FIG. 1 is a side elevation view of the vertical turning machine with parts removed and broken away to permit viewing of internal machine components.

Referring now to the drawings in detail and initially to FIG. 1, there is illustrated a dedicated vertical turning machine 10 in accordance with the present invention. As is described below, the vertical turning machine 10 is designed and adapted as a machine dedicated to the manufacture of a small number of different parts at a very high rate. As such, the vertical turning machine 10 is preferably designed with a minimal number of moving parts and assemblies and is adapted to turn the workpiece to be machined at a high rate with minimal vibration and chatter. The vertical turning machine 10 includes a base 12 to which is mounted a drive motor 14, a spindle assembly 16 and a vertically extending frame 17 supporting a cutting assembly 18. The base 12 and frame 17 are preferably connected and designed with adequate mass and structural rigidity to provide significant damping to the machine 10 to reduce harmonics and vibrations (i.e., chatter) generated by cutting action of the machine and rotation of the drive motor 14.

The spindle assembly 16 includes a spindle housing 20 within which is rotatably mounted through conventional bearings (not shown) a spindle shaft 22 for transferring rotational power from a pulley 24 to a chuck 26 holding the part, such as stock for an aluminum truck wheel 28, to be machined. The chuck 26 may be any of an assortment of known mechanisms, and preferably one adapted for gripping a cylindrical workpiece, such as a three-jaw chuck, etc. The pulley 24 is affixed to the lower end of the spindle shaft 22 located beneath the spindle housing 20 and opposite the chuck 26. The pulley 24 is in alignment with a pulley 30 driven by the drive motor 14.

The pulley 24 which turns the spindle shaft 22 and thus the stock material 28 to be machined is coupled to the pulley 30 of the drive motor 14 by preferably a single drive belt 32. The drive belt 32 preferably includes multiple laterally extending teeth or ribs 34 on its internal surface 36 confronting the pulleys 24 and 30 and may be in the form of or similar to a conventional timing belt. The pulleys 24 and 30 are adapted to engage with the teeth of the drive belt 32 and may be conventional timing pulleys. The pulleys 24 and 30 are preferably of relatively large diameters in order to minimize the tension on the drive belt 32 necessary to efficiently transfer rotational power between the drive motor 14 and spindle assembly 16. By minimizing the tension required to efficiently transfer power between the drive motor 14 and spindle assembly 16, such as through use of a timing belt for the drive belt 32 as opposed to conventional belts and by employing large diameter pulleys 24 and 30, wear to the bearing assemblies in the spindle assembly and in the drive motor can be significantly reduced. The use of a timing belt as opposed to conventional belts which transfer power from the belt to a pulley based on friction caused by tension alone, also allows the drive motor 14 to turn at a lesser speed than it would need to turn with a conventional belt due to slippage losses in the conventional pulley/belt connection. Such a configuration also reduces wear on the drive belt 32 and the drive motor 14.

The drive motor 14 is preferably a single speed, relatively large horsepower motor, for example a 100 horsepower motor, which drives the rotation of the spindle assembly 16 at a high speed through the interaction of the pulleys 24 and 30 and drive belt 32. One exemplary motor for the drive motor 14 is a Westinghouse 100 HP, DC motor. However, any motor of suitable size and make that is capable of performing the turning operation may be employed.

The drive motor 14, the pulleys 24 and 30 and the drive belt 32 form a direct drive system for rotating the spindle assembly 16 at a constant high speed rotational velocity. The dedicated nature of the turning machine 10 eliminates the need for a drive transmission thus allowing for the spindle assembly 16 and workpiece 28 to be turned at a high velocity. The elimination of a transmission also reduces vibration in the machine 10 as well as reduces maintenance costs. The rotational velocity at which the spindle assembly 16 can be turned is preferably adequate that chip fragments aviate off the workpiece at a rate that causes the heat generated by the cutting action to be removed with the aviated chips, for example, in the vicinity of 1700 revolutions per minute. Consequently, cooling lubricant is not required to be applied to the workpiece and cutting tool, at least during course cutting operations, in order to reduce heat and prevent premature degradation of the cutting tool.

Figure 2:
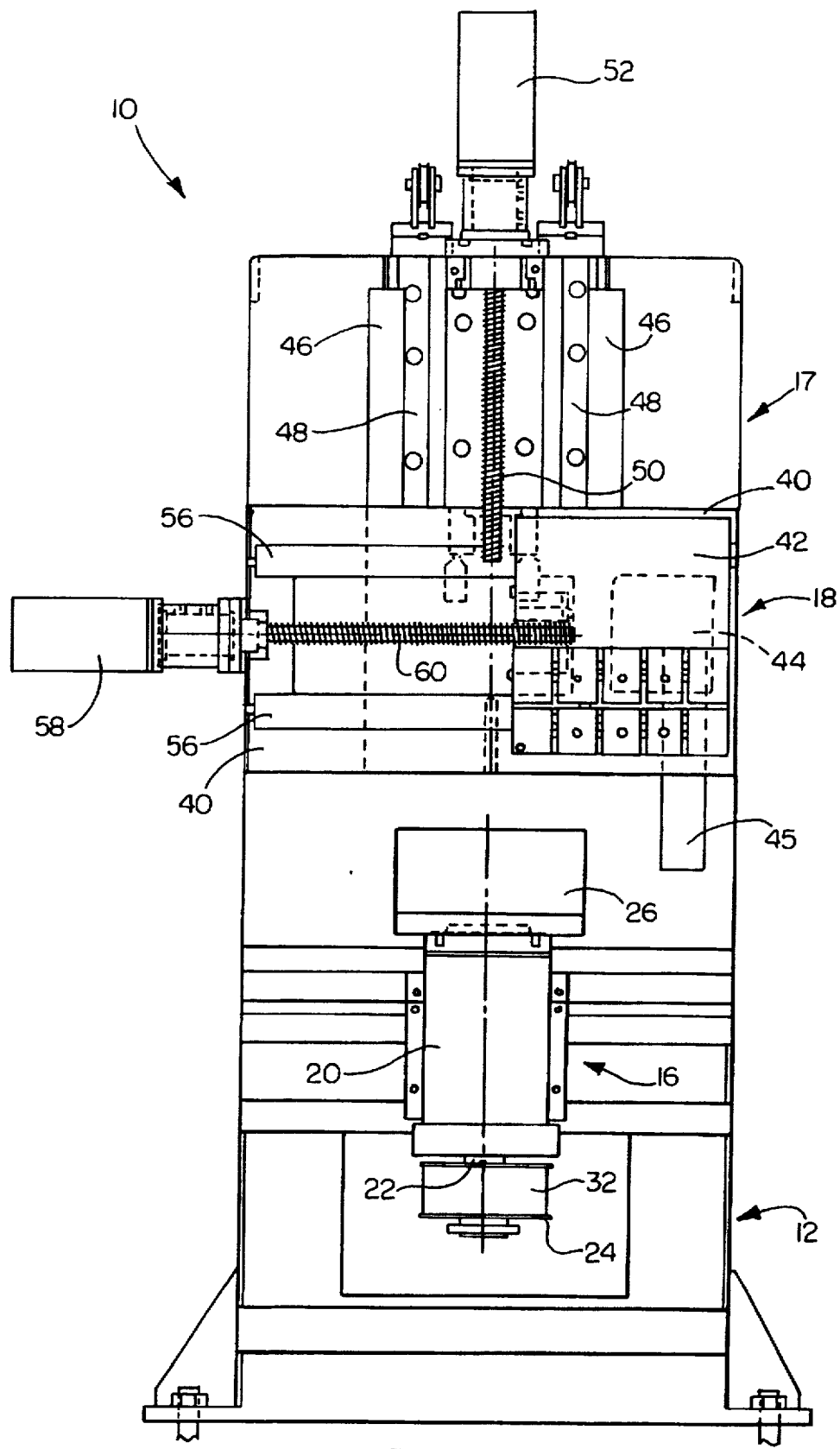
FIG. 2 is front elevation view of the vertical turning machine of FIG. 1.

Referring to FIGS. 1 and 2, the cutting assembly 18 includes a cutting assembly base 40 upon which the various elements of the cutting assembly are secured, including the cutting head 42 and the tool block 44 to which the cutting tool 45 is mounted. Also mounted to the cutting assembly base 40 opposite the cutting head 42 are a pair of vertically extending slides 46 in mating engagement with a pair of vertically extending rails 48 mounted to the frame 17. The vertical slides 46 and rails 48 are adapted to permit substantially only vertical movement of the cutting assembly 18 relative to the spindle assembly 16 and workpiece 28. Vertical movement of the cutting assembly 18 is accomplished through a vertically extending screw 50 extending between the cutting assembly and a motor 52 mounted to the frame 17. The screw 50 is threadedly engaged with the cutting assembly 18 such that rotation of the screw by the motor 52 causes the cutting assembly to slide upwardly or downwardly along the rails 48 depending on the direction of rotation of the screw.

The cutting head 42 is secured to the cutting assembly base 40 through a pair of horizontal slides 54 mounted to the cutting head opposite the tool block 44 which are adapted for sliding engagement with corresponding horizontally extending rails 56 mounted to the cutting assembly 40 opposite the vertical slides 46. A motor 58 mounted to the cutting assembly base 40 drives a screw 60 in threaded engagement with the cutting head 42. Rotation of the screw 60 in the appropriate direction by the motor 58 thus causes the cutting head 42 and attached tool block 44 and cutting tool 45 to move horizontally relative to the cutting assembly base 40 as well as to spindle assembly 16 and workpiece 28.

The weight of the cutting assembly 18 and related components is counterbalanced by a weight 62, preferably composed of a number of individual steel weights 64. A leaf chain 66 extends upwardly from the cutting assembly base 40 and passes over a pair of sprockets 68 which direct the chain down through an internal chamber 70 within the frame 17 in which the weight 62 is suspended. The vertical travel of the cutting assembly 18 is thus limited to the travel T of the weight 62 within the internal chamber 70 of the frame 17.

As the vertical turning machine 10 is dedicated to the manufacture of a limited number of parts, with a limited number of tooling changes, the machine preferably does not include a turret. The elimination of the turret significantly reduces vibration and chatter in the machine 10 and allows the cutting assembly 18 to be secured to the frame 17 is a more stable manner.

Appropriate control of the motors 52 and 58, as can be accomplished through known control systems, permits the cutting tool 45 to be guided along the desired path relative to the workpiece 28 being turned by the spindle assembly 16 to machine the workpiece to the desired shape.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claim is:

1. A vertical turning machine, comprising:
   a base; a spindle assembly mounted to the base for turning a workpiece; a motor mounted to the base for powering the spindle assembly; a direct drive assembly for transferring power from the drive motor to the spindle and a cutting assembly for removing material from the workpiece; wherein the direct drive assembly includes a first timing pulley mounted to the motor and a second timing pulley mounted to the spindle assembly and a timing belt extending between the pulleys.

2. The machine of claim 1, wherein the base includes a vertically extending frame to which the cutting assembly is slidably mounted.

3. The machine of claim 1, wherein the cutting assembly is counterbalanced by a weight.

4. The machine of claim 1, wherein the direct drive system includes a single belt.

5. The machine of claim 1, wherein the machine is turretless.

6. The machine of claim 1, wherein the spindle is turned at a rate of at least approximately 1700 revolutions per minute so that chip fragments aviate off the workpiece thereby removing heat from the workpiece.

7. A turretless turning machine dedicated to the manufacture of a limited number of parts, comprising:
   a base; a spindle assembly for holding and turning a workpiece; a motor; a direct drive assembly for transferring power from the motor to the spindle assembly; and a cutting assembly; the base being of sufficient mass and area to provide a damping force that facilitates reducing vibrations and harmonics generated by the machine, the motor and direct drive assembly being adapted to rotate the spindle assembly about a vertical axis at a rate wherein chip fragments aviate off of a workpiece being machined such that heat generated by a tooling process is removed by the chip fragments which have absorbed the heat.

8. The machine of claim 7, wherein the direct drive assembly includes a first timing pulley mounted to the motor and a second timing pulley mounted to the spindle assembly and a timing belt extending between the pulleys.

9. The machine of claim 7, wherein the base includes a vertically extending frame to which the cutting assembly is slidably mounted.

10. The machine of claim 9, further including a counterweight assembly secured to the cutting assembly and suspended within the frame.

11. The machine of claim 10, wherein the counterweight assembly comprises a chain assembly.

* * * * *